United States Patent [19]

Vogel et al.

[11] Patent Number: 4,999,714

[45] Date of Patent: Mar. 12, 1991

[54] STILL VIDEO CAMERA HAVING VIDEO SYNCHRONIZED TO DRIVE MOTOR PHASE

[75] Inventors: Richard M. Vogel, Henrietta; Mitchell J. Milton, Webster, both of N.Y.

[73] Assignee: Eastman Kodak Company, Rochester, N.Y.

[21] Appl. No.: 376,184

[22] Filed: Jul. 6, 1989

Related U.S. Application Data

[63] Continuation of Ser. No. 9,324, Jan. 30, 1987, abandoned.

[51] Int. Cl.$^5$ .............................................. H04N 5/95
[52] U.S. Cl. ..................................... 358/337; 358/906; 358/342
[58] Field of Search ................ 358/385, 338, 342, 906, 358/908, 337, 339; 360/33.1, 35.1, 70, 73.03

[56] References Cited

U.S. PATENT DOCUMENTS

| | | | |
|---|---|---|---|
| 4,278,924 | 7/1981 | Mawatari et al. | 360/70 X |
| 4,507,690 | 3/1985 | Azuma et al. | 360/33.1 |
| 4,554,602 | 11/1985 | Tobe | 358/338 X |
| 4,567,535 | 1/1986 | Kinjo | 360/87 |
| 4,691,252 | 9/1987 | Okada et al. | 360/35.1 X |
| 4,692,815 | 9/1987 | Kawahara et al. | 358/355 |
| 4,710,825 | 12/1987 | Okita et al. | 358/338 X |
| 4,710,827 | 12/1987 | Okita | 360/73 X |
| 4,717,969 | 1/1988 | Miyake | 358/338 X |
| 4,758,905 | 7/1988 | Okada et al. | 358/906 X |
| 4,802,020 | 1/1989 | Miyake et al. | 358/906 X |
| 4,809,119 | 2/1989 | Tsuyuguchi | 360/73.03 |
| 4,815,063 | 3/1989 | Aoshima et al. | 358/338 X |
| 4,823,203 | 4/1989 | Narusawa | 360/73.03 X |
| 4,927,264 | 8/1990 | Narusawa | 358/337 |

FOREIGN PATENT DOCUMENTS 167148  1/1986  European Pat. Off. .

OTHER PUBLICATIONS

Video Tape Recorders, Kybett; Sams & Co. Inc. ©1974, p. 290–297.

Primary Examiner—Donald McElheny, Jr.
Attorney, Agent, or Firm—David M. Woods

[57] ABSTRACT

A still video camera produces a still signal for recording on a magnetic disk and a movie signal for displaying in an electronic viewfinder. In recording the still picture . . . after previewing the scene in the viewfinder . . . , a vertical synchronizing signal is recorded in predetermined relation to a reference position on the disk. Instead of phase locking the disk drive to the vertical synchronizing signal, the time base of the camera is "locked" to variations in the location (phase) of the reference position. The camera is thus affected by a relatively instantaneous reset of the time base rather than an inertially-limited adjustment of the drive motor, which tends to "blind" the electronic viewfinder for the duration and renders previewing unacceptable. By attempting the video reset only after the disk has been stabilized at a standard velocity (by a velocity servo) and by "windowing" the reference position for "acceptable" phase error, the viewfinder is further unburdened of visually-disruptive effects that impede effective still photography.

2 Claims, 5 Drawing Sheets

STILL VIDEO CAMERA HAVING VIDEO SYNCHRONIZED TO DRIVE MOTOR PHASE

This is a continuation of application Ser. No. 009,324, filed Jan. 30, 1987 now abandoned.

BACKGROUND OF THE INVENTION

1. Field of the Invention

The present invention relates to the field of still video imaging, and especially to servos and video synchronization circuits for a compact still video camera of the type that produces a movie image for an electronic viewfinder in addition to a still image for recording.

2. Description Relative to the Prior Art

A still video recording standard has been proposed in which a small, flexible magnetic disk is used to store up to 50 still video pictures. The recording format provides the option of storing a full frame (two circular tracks per picture) for 25 pictures, or a single track (one circular track per picture) for 50 pictures. According to this standard, a radial reference position is defined in relation to the disk by providing a small metal insert (referred to as the PG yoke) in a hub that supports the disk for rotation. The location of this insert is sensed continuously as the disk is rotated and the so-called PG pulse or signal is derived from this location. The leading edge of the vertical synchronizing signal is then positioned seven horizontal lines (± two lines) from the reference position, i.e., from the occurrence of the PG signal. In addition, for full frame recording, the PG signal serves as a reference for head switching. The standard calls for the rotation of the disk at 3600 r.p.m.; head switching, therefore, occurs at the field rate.

With these requirements in mind, it is apparent that the rotation of the disk must be controlled both as to velocity (3600 r.p.m.) and as to phase (reference position). The usual way to control the disk is to lock its rotation to the aforementioned video standard, viz., to use a velocity servo to control its speed and a phase servo to control the angular position of the disk. This is seen in still video equipment, for example, in published European patent application No. 167,148 (Jan. 8, 1986) in which a servo for a dc motor receives a frequency (velocity) input from a frequency generator and a phase input from a phase generator located adjacent to the area of the disk containing the PG yoke. U.S. Pat. No. 4,567,535, albeit intended for use with a small magnetic drum rather than a disk, discloses a similar arrangement for achieving a constant phase relationship in a still video camera. In both cases, the phase servo is referenced to the field frequency (vertical sync).

This type of servomechanism presents a special problem in the case of a still video camera having an electronic viewfinder. Such a viewfinder is particularly useful for previewing the picture as it will actually appear subsequent to video processing. The manner in which a still camera is likely to be used will sometimes involve quick movements followed by a still recording. One can imagine looking through the viewfinder while rapidly "panning" the camera or otherwise moving into position for a candid photo. The problem is that the motor, composed of mechanical components, can destabilize or "unlock" due to rapid movement and then, due to the same mechanical bulk, take a significant time to get back into synchronization. During this time a picture cannot be taken because the disk drive has not been stabilized at the correct velocity and phase. What one previews through the viewfinder, and wants to record, is thus lost.

Phase locking the motor to vertical sync is the slowest part of the servo because the reference is necessarily a low frequency. It is known in the case of helical recording to take a reverse approach and forcibly phase synchronize a video camera with a recorder (see the discussion of servo systems in *Video Tape Recorders*, by Harry Kybett, 1974, particularly pp. 291-296.) In such a camera the heads are rotated at an exact speed, and their tachometer pulses (15,750 Hz, nominally) are the reference to which the video "locks". (See also U.S. Pat. No. 4,507,690, in which this type of technique is applied to a video camera to reset the sync signal generator when the camera is brought out of a "pause" state.) Since the video can be "locked" quickly, it is possible to achieve phase synchronization in a short time even when a slow response motor is used. Now, however, the video itself is synchronized to the inertially-bound tendencies of the drive mechanism and the aforementioned rapid camera movements not only disable the picture-taking mechanism (while the velocity servo operates) but garble the viewfinder display as well. Not only is the desired scene lost but the viewer is "blind" to what is happening, at least as seen through the electronic viewfinder.

SUMMARY OF THE INVENTION

To begin with, the signal processing section, and in particular the electronic viewfinder, should not be tied to the inertial limitations of the disk drive. Allowing the video time base to run free of the phase servo until the motor is "locked" to a standard velocity goes part way to a solution; then the electronic viewfinder is unaffected by relatively slow inertial adjustment of the velocity of the drive motor by the velocity servo. When phase adjustment is attempted, an additional advantage is obtained by resetting the time base . . . an almost instantaneous response . . . rather than by phase locking the motor position . . . a relatively slow process. Furthermore, the phase of the motor can be allowed to "wander" within defined limits (±2 lines) without significantly disturbing the recording (and playback) process. By suppressing a phase adjustment for such small variations in the PG signal, the electronic viewfinder display is further unaffected by rapid movement of the camera. Accordingly, the net effect is that the user is seldom "blinded" to ongoing action, and then only for an instant as the video time base is reset.

Apparatus according to the invention includes a time base generator for providing a vertical synchronizing signal and a master oscillator for providing a motor frequency reference signal. The motor reference signal is input to a velocity servo for regulating the angular velocity of a drive motor. When the motor is stabilized at the correct speed, the velocity servo issues a lock-up signal. Meanwhile phase pulses are being generated in correspondence to the sensed location of a radial reference position on the disk. After the lock-up signal is produced, a phase control means adjusts the time base generator so that the vertical synchronization signal resumes its correct relation to the reference position. Additional stability, particularly in the viewfinder display, is provided by suppressing time base adjustment for predetermined small irregularities in the occurrence of the phase signal. The suppression takes, in more specific detail, the form of a "window" within which phase adjustment is not attempted.

BRIEF DESCRIPTION OF THE DRAWINGS

The invention will be described in relation to the drawings, in which.

DETAILED DESCRIPTION OF THE PREFERRED EMBODIMENT

Because video cameras including servo mechanisms are well known, the present description will be directed in particular to elements forming part of, or cooperating more directly with, apparatus in accordance with the present invention. Elements not specifically shown or described herein may be selected from those known in the art.

Figure 1:
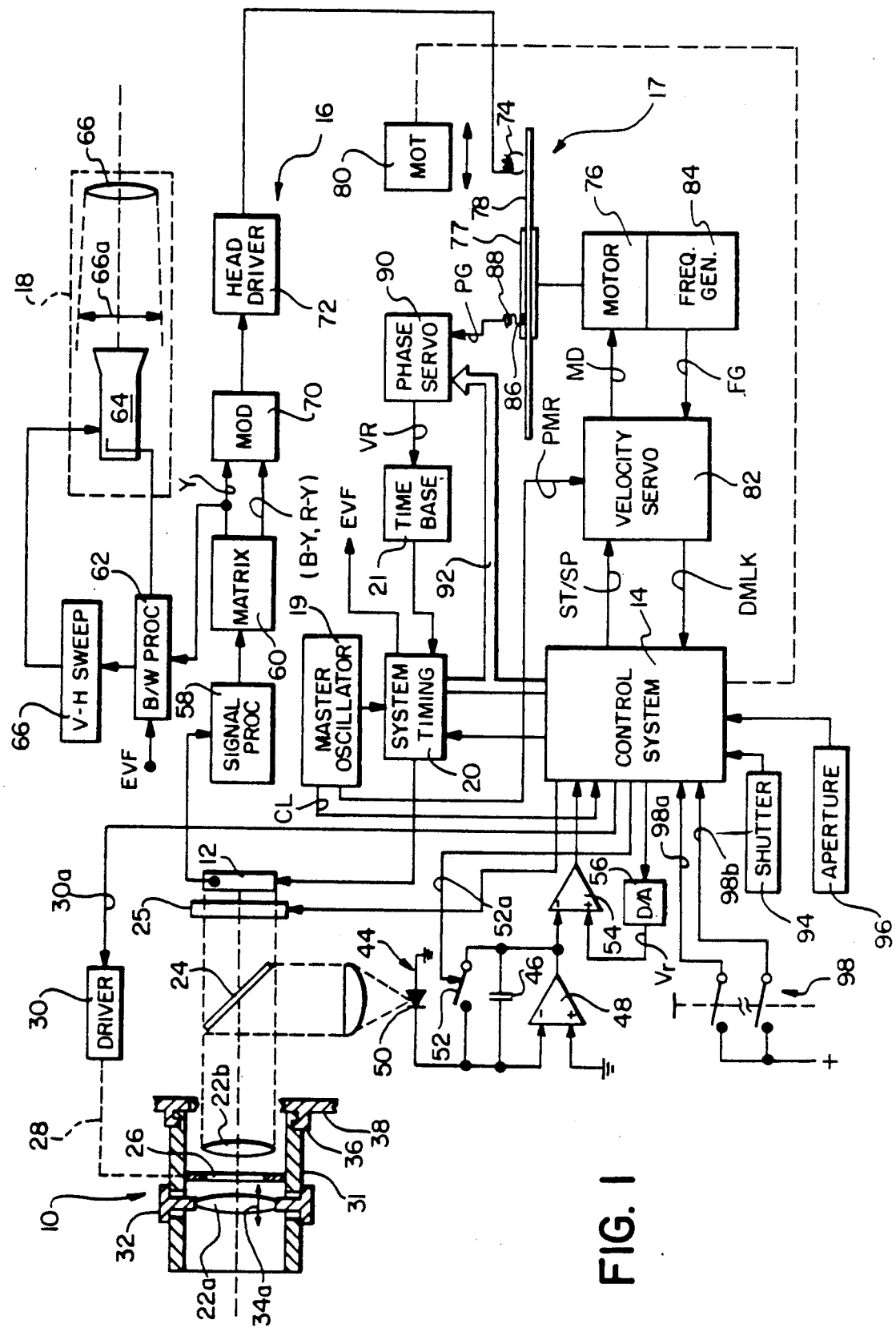
FIG. 1 is a block diagram of a still video camera incorporating a time base "locked" to a phase servo according to the invention.

Referring initially to FIG. 1, the pertinent sections of a still video camera are shown for purposes of describing the invention. An optical section 10 directs image light to an imager 12, such as a conventional solid state inter-line transfer imager. A microprocessor control system 14 controls the general operation of the camera, including the velocity and phase servos. A signal processing section and a recording section are generally shown by the reference characters 16 and 17, respectively. An electronic viewfinder 18 operates during a movie mode to display the image being viewed by the optical section 10 prior to recording. A master oscillator 19 generates the basic frequency signals from which all other signals are derived, especially the system clock signal CL for system timing and a motor reference signal PMR for the recording section 17. A timing circuit 20 provides the signals for clocking image charge from the imager 12 and synchronizes the signal processing and recording sections 16 and 17 to the output of the imager 12. A time base generator 21 produces the vertical and horizontal drive signals according to NTSC standards (or any other) for driving the system timing circuit 20.

The optical section 10 includes lens elements 22a and 22b for directing image light from a subject (not shown) toward the imager 12 through a partially transmissive mirror 24 and a conventional focal plane shutter 25. The shutter 25 is used to control exposure time in the still mode. (In the movie mode the timing circuit 20 effectively determines the movie exposure interval by controlling the readout of the imager 12.) A diaphragm 26 regulates the optical aperture by a mechanical linkage 28 with a diaphragm driver 30, which connects with the control system 14 by a line 30a. The lens elements 22a and 22b and the diaphragm 26 are mounted within a lens barrel 31; the lens element 22a is further mounted within a focusing housing 32 which is capable of external adjustment (manual) for focusing an image of the subject on the imager 12. Such adjustment displaces the lens according to arrow 34a. The optical section is schematically shown as an interchangeable lens having its barrel 31 attached to a bayonet mount 36 on a camera body (shown in part by the reference character 38).

The optical section 10 also interacts with an exposure control circuit 44, which receives a sample of image light diverted by the mirror 24. The exposure control circuit 44 includes an integrator composed of a capacitor 46 connected between the inverting input and the output of an operational amplifier 48. The output of the amplifier 48 is an integral over time of a photocurrent produced by a photodiode 50 and applied to the inverting input of the amplifier 48. A reset switch 52 is connected across the capacitor 46 for resetting the circuit 44 according to the condition of a signal on a line 52a from the control system 14. The output voltage of the amplifier 48 increases until it equals a reference voltage $V_r$ provided to a comparator 54, which then changes state to indicate the end of an integration cycle. The value of the reference voltage $V_r$ is output as a digital number from the control system 14 and converted into an analog voltage by a digital-to-analog converter 56. The control system 14 includes a software counter (not shown) which can be zeroed at the beginning of an integration cycle and stopped when the comparator 54 changes state. The value in the counter at that moment therefore represents the integration time, which corresponds to the brightness of the image light diverted upon the photodiode 50.

The movie mode is initiated by partially depressing a two position shutter button 98 to its first position thereby setting a signal on a line 98a high. When the control system 14 senses that the signal on the line 98a is high, it causes the system timing circuit 20 to issue the signal EVF and enable the viewfinder 18. At this time, a reset signal is issued on the line 52a to start the exposure integration cycle. From the calculated integration time, the control system 14 determines a movie aperture for operating the viewfinder; a still aperture and/or exposure time is also established for a prospective still exposure under the present light conditions according to the input from shutter and/or aperture switches 94 and 96 and the known movie aperture. The still exposure conditions (aperture and/or exposure time) are then stored by the control system 14 until called for. The still mode is initiated by further depressing the shutter button 98 until a signal on the line 98b is set high. The control system 14 then sets the diaphragm 26 via the driver 30 to the stored still aperture value and actuates the shutter 25 according to the stored exposure time.

The video signal generated by the imager 12 is applied to a signal processing circuit 58, which separates the colors (red, green and blue) and applies gain, white balance and gamma correction to the signals. The color signals are applied to a matrix 60, which produces a luminance (Y) signal, and a line-sequential stream of color difference signals (B-Y, R-Y). The luminance signal is tapped at this point and directed through a monochrome signal processing circuit 62 to a display tube 64 in the electronic viewfinder 18. The viewfinder display, which is controlled by a vertical and horizontal sweep circuit 66, is activated according to the condition of the viewfinder signal EVF from the system timing circuit 20. The electronic viewfinder 18 also includes a viewing lens 66 for framing a field of view 66a that is visible to a user of the camera.

The luminance signal and the color difference signals are input to a modulator 70, which provides a selected preemphasis to the input signals and frequency modulates a suitable set of carriers with the preemphasized signals. The modulated signal is amplified by a head driver circuit 72 and applied to a recording head 74. The recording section 17 also includes a disk drive motor 76 for engaging a central hub 77 of a magnetic disk 78 and for rotating a magnetic surface of the disk 78 adjacent the recording head 74. The head 74 is moved by a stepper motor 80 coupled to the control system 14 for recording a plurality of concentric tracks (which correspond to a plurality of images). A conventional velocity servo circuit 82 compares a feedback signal FG from a frequency generator 84 (coupled to the motor 76) with the motor frequency reference signal PMR from the master oscillator 19. Pursuant to this comparison, the velocity servo 82 applies the motor drive signal MD to the motor 76 for driving the motor 76 at the standard rotational velocity (3600 r.p.m.). Since the velocity servo is distinct from the vertical sync-dependent phase servo, the frequency of the reference signal PMR (and the nominal feedback signal FG) is selected for adequate servo loop band-width, thereby facilitating more rapid stabilization at the standard velocity. In practice a high frequency in the master oscillator 19 is divided down to obtain the signal PMR, e.g., the color subcarrier is divided down to 899 Hz to obtain the signal PMR.

A predetermined reference position is defined relative to the disk 78 by implanting a metal insert 86 (the PG yoke) in the hub 77. A sensor 88 is mounted adjacent the hub 77 so that it generates a pulsating phase (PG) signal as the disk 78 is rotated (one pulse per revolution) and the insert 86 passes adjacent the sensor 88. It will be appreciated that the timed recurrence of the pulsations in the PG signal corresponds to the angular or phase stability of the rotating disk, i.e., a variation in the PG signal represents a "wandering" of the reference position to which the vertical synchronizing signal must be related. The PG signal is applied to a phase servo 90 which, according to variations in the PG signal, provides a reset signal VR to the time base generator 21. Signals necessary for operation of the phase servo 90, besides the PG signal, are schematically shown as applied over a conduit 92.

The phase servo 90, which is shown in greater detail in FIG. 2, will be described in connection with waveform diagrams in FIGS. 3, 4 and 5 that illustrate its operation. Control of phase is accomplished by utilizing the PG signal to reset the NTSC time base provided by the time base generator 21 such that the vertical synchronizing signal is forced to occur at the proper time in relation to the PG signal. The signals applied to the phase servo include the aforementioned PG signal, a motor lock signal DMLK indicating that the disk motor 76 is operating at the standard velocity, a field signal FLD indicating that the video signal from the imager 12 is either field one (FLD=1) or field two (FLD=0), the vertical drive signal VD and the horizontal drive signal HD. The output of the phase servo 90 is a vertical reset signal VR directed to the time base generator 21.

At the beginning of field two (FLD=0) an eight-bit binary counter 100 is preset to a count of seven (more particularly, a count of seven will be loaded when the vertical drive signal VD goes low after the output of an inverter 102 and NOR gate 104 both enable the inputs ENP and ENT of the counter 100). As shown by FIG. 3, during line 269 the counter 100 is enabled and begins to count horizontal drive pulses HD for as long as the field signal FLD is low (i.e., as long as input ENT is enabled). At the beginning of line 517, as shown by FIG. 4, the counter 100 achieves a count of 255 (248+7, hence counter 100 is a divide by 248 counter) and its ripple carry output RCO (1) goes high. The counter 100 is inhibited for one line via feedback through the gate 104 causing the RCO (1) output to remain high for two consecutive lines. At the beginning of line 518 the level of RCO (1) . . . i.e., high . . . is loaded into a type-D flip-flop 106 causing its negative output Q (the signal WIN) to go low. This low Q signal serves as a two line "window" during which the PG signal is unable to set a type-D reset flip-flop 108.

The PG signal is applied to the clocking input of the flip-flop 108 via a NAND gate 110, which also receives the disk motor lock-up signal DMLK and the inverse of the field signal FLD. The effect of the gate 110 is to allow a transition in its output only when the disk motor has attained standard speed (DMLK=1), the second field is being processed (FLD=1) and a PG signal is sensed. This means that vertical reset is never attempted until the velocity servo 82 has "locked" the motor 76 to its standard angular velocity, i.e., 3600 r.p.m. This avoids the situation of frequent attempts at vertical reset to correct phase instability caused in large part by velocity variability. By waiting until the motor 76 is stabilized at standard velocity, the disturbance of the video display in the viewfinder (caused by the vertical reset) is thus minimized.

When the gate 110 applies a signal to the clock input of the flip-flop 108, it will cause a change in its Q output, but only when the D input is high. This means that the occurrence of the signal PG within the "window" signal WIN, which indicates normal operation, will not change the Q output of the flip-flop 108. Normal operation is illustrated by the waveforms of FIG. 4 relative to the PG signal, which should precede the vertical synchronizing signal by seven (± two) lines. (Note that vertical drive signal VD is a nine line signal that encompasses the vertical synchronizing signal, the beginning edge of which is shown by a broken line in FIG. 4; the vertical synchronizing signal begins three lines into the vertical drive interval, or seven lines from the PG pulse.) The Q output of the flip-flop 108 is connected to the enable input EN of a four-bit counter 112. When operation is normal, this counter remains undisturbed and no reset signal VR is produced at its output (via an inverter 114).

Figure 5:
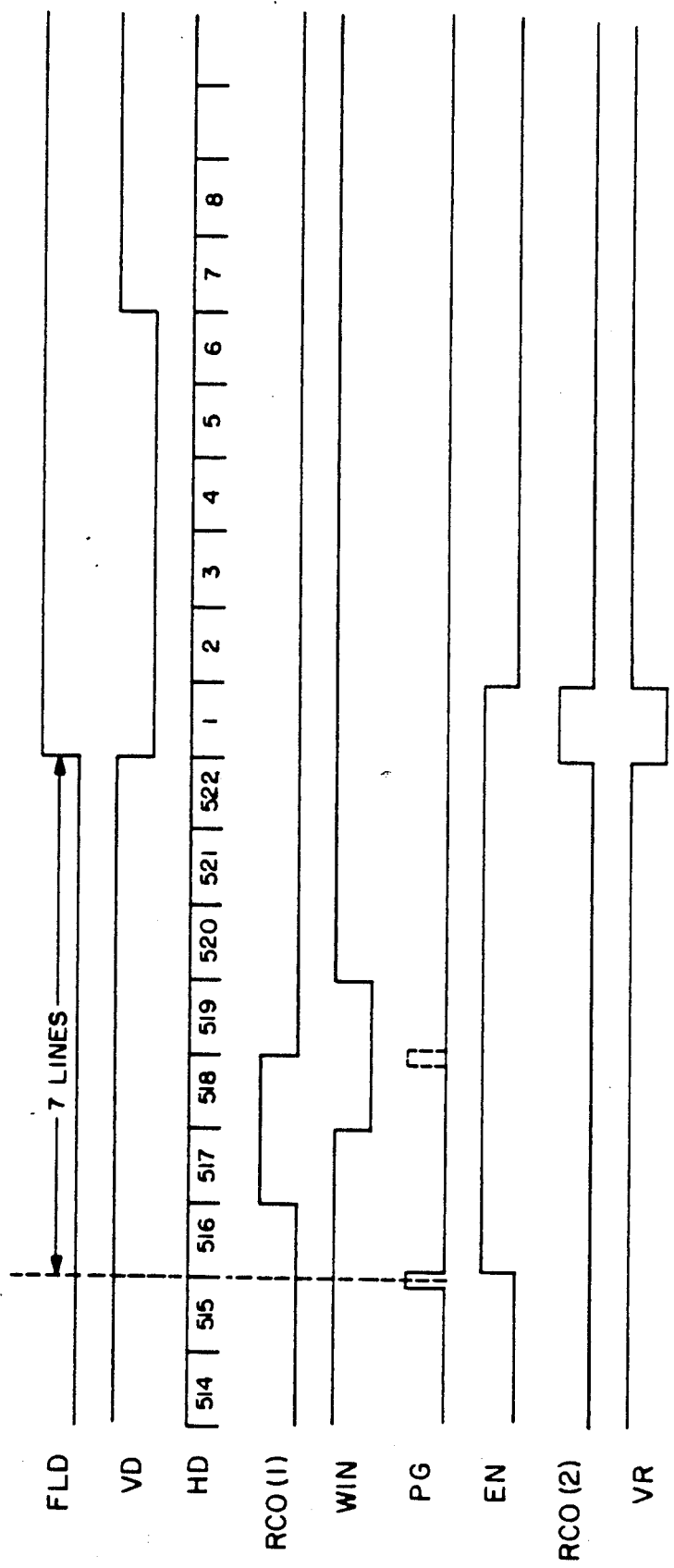
FIG. 5 is a waveform diagram similar to that of FIG. 4 but showing the appearance of the PG pulse in incorrect phase relation.

FIG. 5 illustrates a typical vertical reset sequence in which the PG signal precedes its normal (expected) position by, for example, three lines, thus not occurring within the "window" timing. With the signal WIN high at the D input to the flip-flop 112, the "early" PG signal from the gate 110 resets the flip-flop 108. This changes the state of its Q output and enables the four-bit counter 112, which is preset to a count of eight (thus functioning as a divide by 7 counter). The purpose of this preset is to have the counter 112 count seven lines (thus reaching a count of fifteen and overflowing) before its ripple carry output RCO (2) goes high and generates a reset signal VR for the time base generator 21. This will place the actual PG pulse, and the disk reference position therewith, seven lines prior to the vertical synchronizing signal as required by the specification. (In this example, the change in the vertical drive signal VD at the end of the line 522 happens to correspond with the "new" location for the vertical synchronizing signal.)

The reset pulse on the signal VR is also fed back to the load input of the counter 112, which again presets to a count of eight. The reset pulse is also passed through a one-line delay 116 in order to reset the flip-flop 108 and disable the counter 112 until the next phase adjustment is necessary.

Figure 2:
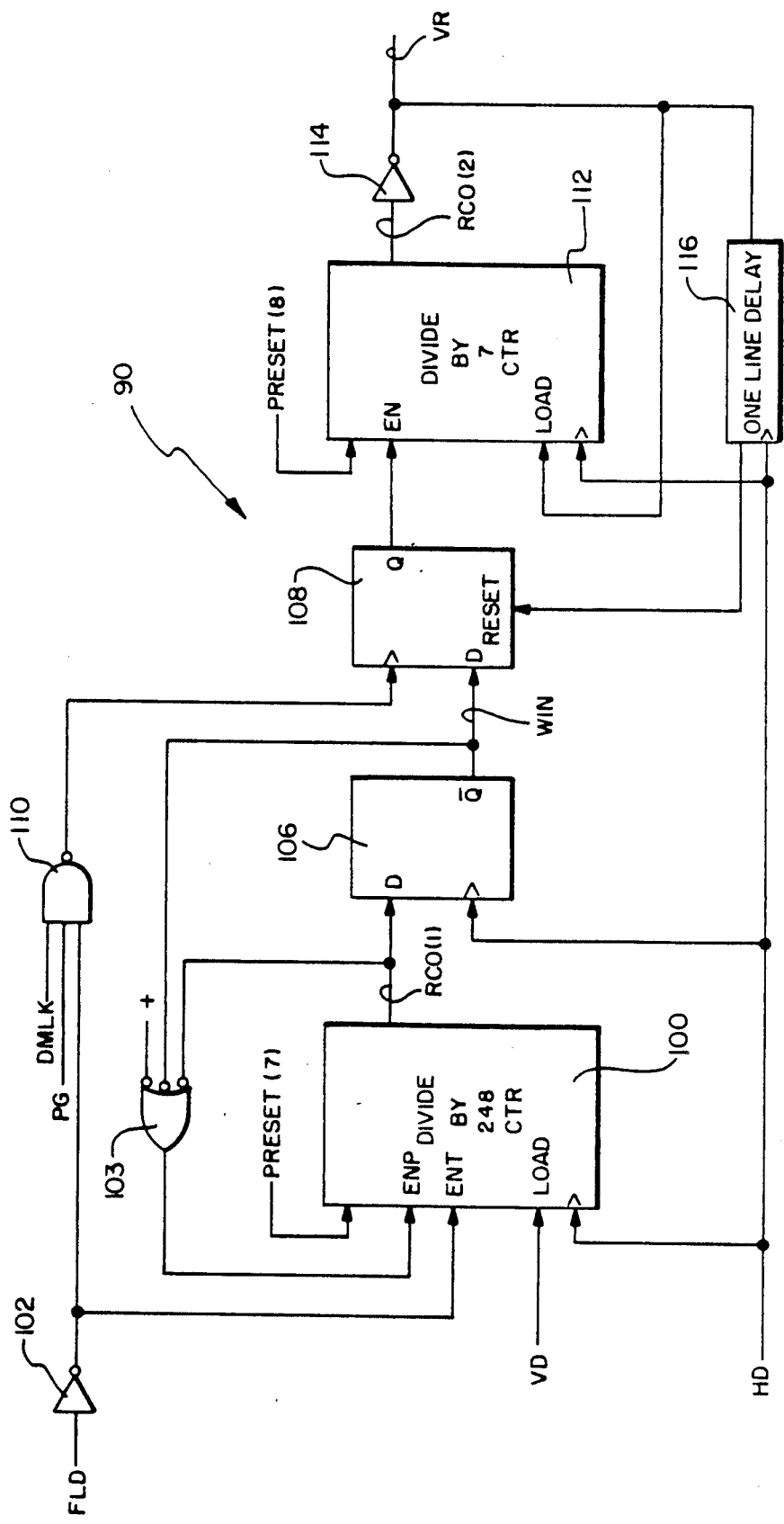
FIG. 2 is a circuit diagram of one embodiment of the phase servo shown as part of FIG. 1.
Figures 3, 4:
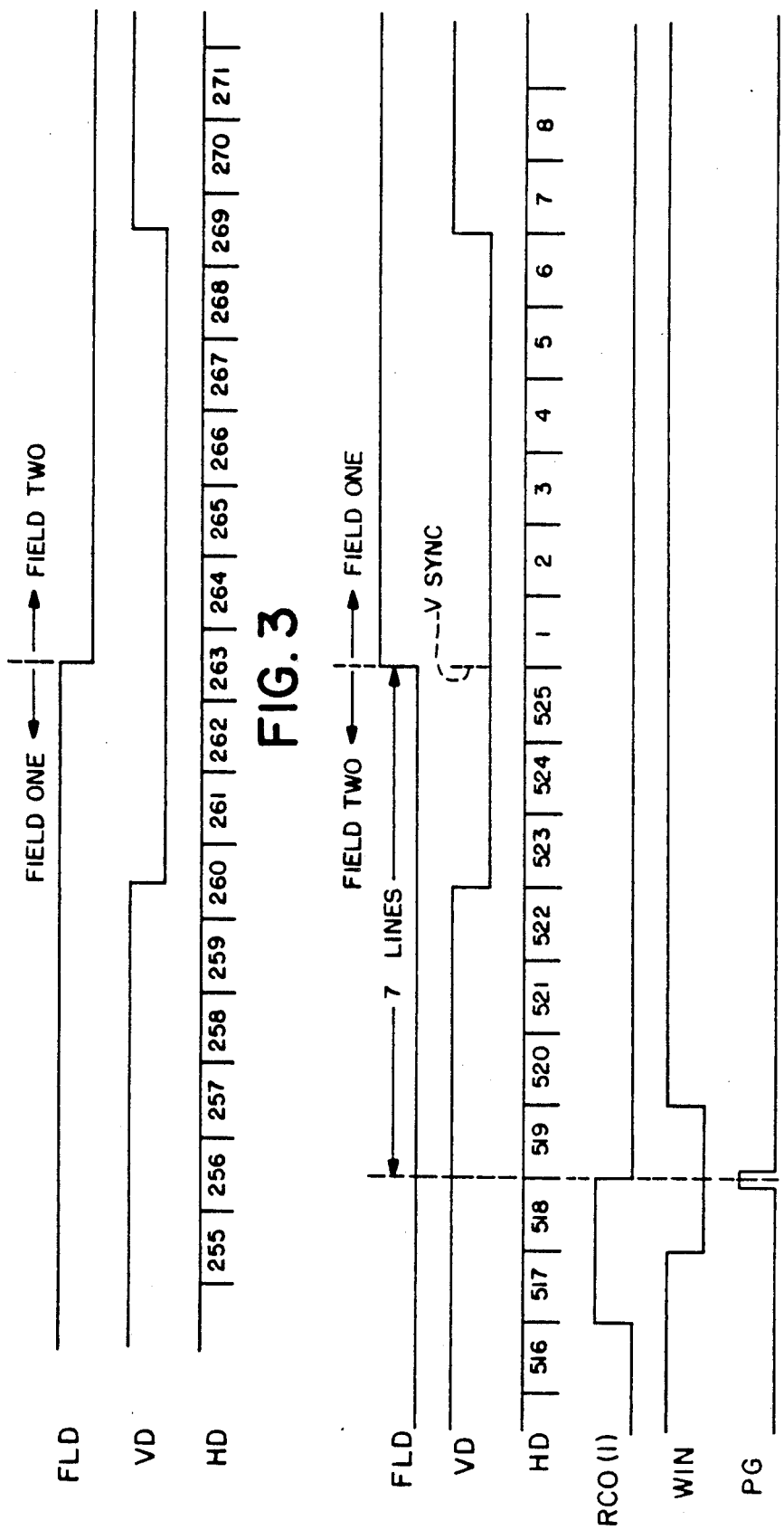
FIG. 3 is a waveform diagram of signals involved in the initialization of counters described in connection with FIG. 2.
FIG. 4 is a waveform diagram showing the appearance of the PG pulse in correct phase relation to the signals processed by the circuit of FIG. 2.

The circuit shown by FIG. 2 and its associated waveforms in FIGS. 3, 4 and 5 illustrate the preferred way of practicing the invention, that is, by "windowing" the incoming PG signal and taking corrective action only when the PG pulse falls outside the "window". This way of processing the PG signal effectively suppresses a correction for predetermined (e.g., two line) small variations in the location of the PG pulse. The advantage of this technique is that it adjusts the vertical time base only for significant phase variations. When combined with the technique of delaying the vertical reset until the velocity servo 82 has stabilized the motor 76 at a standard velocity, the invention has the advantageous effect of preserving an essentially uninterrupted view through the electronic viewfinder despite movement of the camera. Though a two line "window" is preferred, it should be apparent that any small whole or fractional multiple of horizontal video lines, even one line or a fraction of one line, may be acceptable in certain cases.

Figure 6:
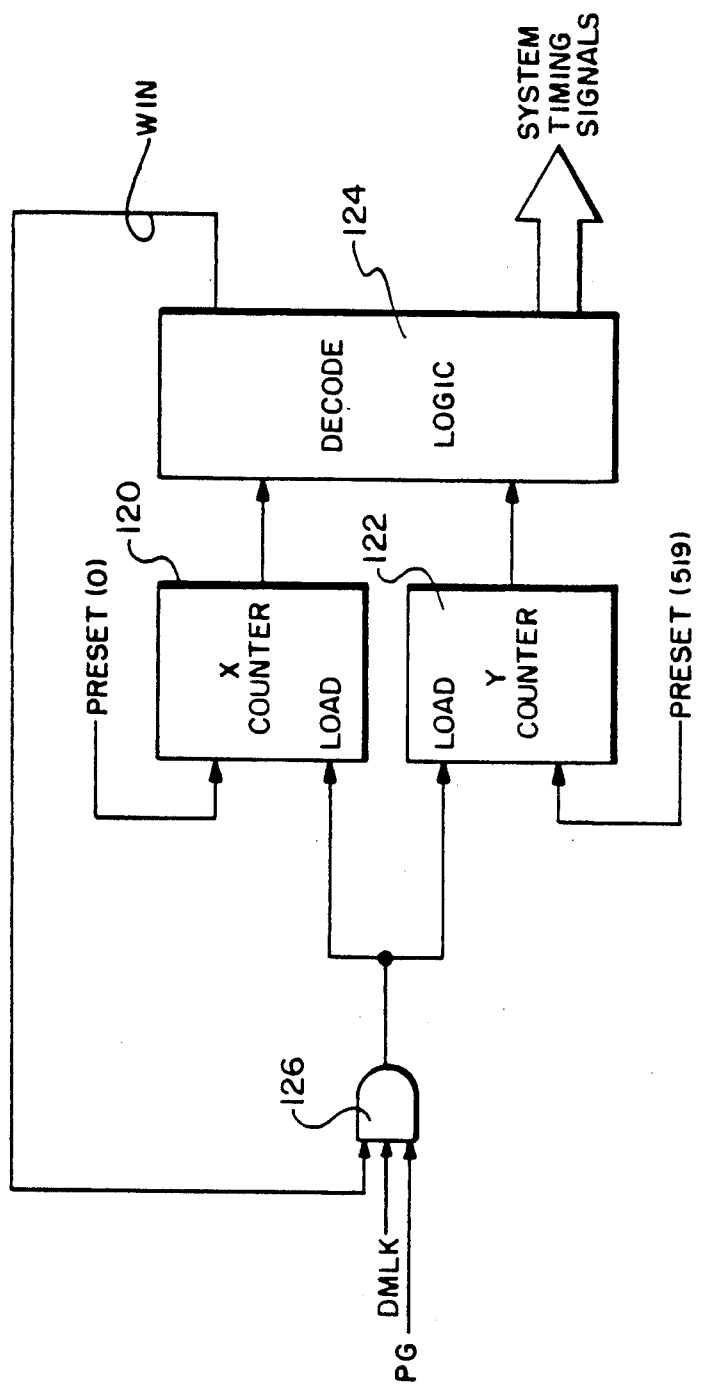
FIG. 6 is a circuit diagram of another embodiment of the phase servo shown as part of FIG. 1.

Notwithstanding the circuit of FIG. 2 there are other ways of producing a "window" signal and accomplishing the aforementioned processing of the PG pulse. FIG. 6 illustrates another processing scheme that depends on a pixel count from an X counter 120 and a line count from a Y counter 122. The counters 120, 122 are preset to X=0 and Y=519 to correspond to the expected location of a PG pulse (see the location of the PG pulse relative to the horizontal drive signal HD in FIG. 4). The "window" signal WIN is generated by a decode logic circuit 124 at the beginning of line 518. If the PG pulse should occur outside of the "window" (and the motor lock signal DMLK is high), a signal from the gate 126 causes both counters to immediately reset to the beginning of line 519 (X=0, Y=519), that is, to reset to the line count corresponding to where the PG pulse should be. Unlike the circuit of FIG. 2, this effects an immediate reset of the vertical time base without waiting seven lines. It should also be apparent that the circuits of FIGS. 2 or 6 could be implemented in an integrated circuit, such as a gate array.

The invention has been described in detail with particular reference to a presently preferred embodiment, but it will be understood that variations and modifications can be effected within the spirit and scope of the invention.

What is claimed is:

1. A video time base synchronization circuit for use with a video camera for recording a video signal representative of a still picture on a recording disk, the still video signal including a vertical synchronizing signal that is recorded on the disk in predetermined relation to a sensible, radial reference position when the disk is rotated at a predetermined standard velocity, said camera further including a drive motor for rotating the disk and generating a feedback control signal, a master oscillator for providing a motor frequency reference signal, and a velocity servo responsive to said motor frequency reference signal and said feedback control signal for regulating the angular velocity of the drive motor and generating a lock-up signal when the velocity of the drive motor substantially corresponds to the standard velocity; the improvement wherein the video time base synchronization circuit comprises:

a time base generator for providing the vertical synchronizing signal, said generator responsive to a reset input for resetting the time base of said vertical synchronizing signal;

a window generator for generating a timing signal having a periodic window that recurs in relation to said rotating disk in a position including within its widthwise dimension the expected location of the reference position;

means for generating a phase signal composed of periodic pulses normally occurring within the timing of said periodic window and corresponding to the sensed, actual location of the reference position as the disk is rotated, the rotation of the disk being subject to occasional phase instability whereby one or more of said periodic pulses occur outside of said periodic window; and phase control means responsive to said lock-up signal, said timing signal, and to said occurrence of at least one of said periodic pulses outside of said periodic window, due to said occasional phase instability of the rotating disk, for activating the reset input of said time base generator so that the vertical synchronizing signal is recorded in correct relation to the reference position.

2. A video time base synchronization circuit as claimed in claim 1 in which said window comprises at least one horizontal video line.

* * * * *